(12) United States Patent
Cho et al.

(10) Patent No.: US 9,731,582 B2
(45) Date of Patent: Aug. 15, 2017

(54) DOOR MODULE FOR VEHICLE

(71) Applicants: Sung Ik Cho, Chungcheongnam-do (KR); Jae In Yu, Chungcheongnam-do (KR); Hang Chul Ko, Chungcheongnam-do (KR); Jae Won Lee, Chungcheongnam-do (KR); Hue Yeon An, Chungcheongnam-do (KR)

(72) Inventors: Sung Ik Cho, Chungcheongnam-do (KR); Jae In Yu, Chungcheongnam-do (KR); Hang Chul Ko, Chungcheongnam-do (KR); Jae Won Lee, Chungcheongnam-do (KR); Hue Yeon An, Chungcheongnam-do (KR)

(73) Assignee: Seoyon E-Hwa Co., Ltd. (KR)

( * ) Notice: Subject to any disclaimer, the term of this patent is extended or adjusted under 35 U.S.C. 154(b) by 0 days.

(21) Appl. No.: 15/041,489

(22) Filed: Feb. 11, 2016

(65) Prior Publication Data
US 2016/0229270 A1    Aug. 11, 2016

(30) Foreign Application Priority Data

Feb. 11, 2015 (KR) .................. 10-2015-0020819

(51) Int. Cl.
*B60J 5/04*    (2006.01)

(52) U.S. Cl.
CPC ................. *B60J 5/0416* (2013.01)

(58) Field of Classification Search
CPC ...... B60J 5/0416; B60J 5/0463; B60J 5/0468; E05Y 2900/55; B60R 13/0243; B60R 2013/0287; E05F 11/382
See application file for complete search history.

(56) References Cited

U.S. PATENT DOCUMENTS

| | | | | |
|---|---|---|---|---|
| 4,378,395 A * | 3/1983 | Asoshina | ............... | B32B 27/08 296/146.6 |
| 5,048,232 A * | 9/1991 | Miyagawa | .......... | E05D 15/0647 49/374 |
| 6,139,088 A * | 10/2000 | Okamoto | ............... | B60J 5/0416 296/146.1 |
| 6,301,835 B1 * | 10/2001 | Pfeiffer | ................. | B60J 5/0416 296/146.5 |
| 6,536,832 B1 * | 3/2003 | Grimm | ................. | B60J 5/0416 296/146.5 |

(Continued)

FOREIGN PATENT DOCUMENTS

| | | |
|---|---|---|
| JP | 2001-503696 A | 3/2001 |
| JP | 2002-264652 A | 9/2002 |

(Continued)

*Primary Examiner* — Justin Rephann
(74) *Attorney, Agent, or Firm* — Tarolli, Sundheim, Covell & Tummino LLP

(57) ABSTRACT

Disclosed herein is a door module for a vehicle, which is mounted in a door panel of a vehicle door. The door module may include: a stiffened plate including base plates formed at positions where one or more hardware parts related to the vehicle door are mounted and a connection plate for connecting the base plates, wherein the base plates and the connection plate are integrally formed; and a resin panel covering an opening of the door panel, and formed by over-molding resin onto the stiffened plate, wherein the stiffened plate is formed of a material having higher stiffness than the resin.

14 Claims, 7 Drawing Sheets

(56) References Cited

U.S. PATENT DOCUMENTS

| | | | | |
|---|---|---|---|---|
| 6,874,279 B1* | 4/2005 | Weber | ................ | B60J 5/0416 49/348 |
| 7,413,237 B2* | 8/2008 | Heinze | ................ | B60R 13/0243 296/146.6 |
| 7,774,986 B2* | 8/2010 | Unterreiner | ........... | B60J 5/0404 49/349 |
| 8,109,559 B2* | 2/2012 | Nakamori | ............ | B60J 5/0416 296/146.2 |
| 9,511,652 B2* | 12/2016 | Barr | ................ | B60J 5/0416 |
| 2002/0136889 A1* | 9/2002 | Hiraki | ............... | B32B 15/08 428/335 |
| 2004/0211122 A1* | 10/2004 | Freymuth | ............ | B60J 5/0416 49/502 |
| 2004/0217623 A1* | 11/2004 | Chernoff | ............. | B60J 5/045 296/146.6 |
| 2005/0052050 A1* | 3/2005 | Kora | ............... | B60J 5/0416 296/146.1 |
| 2007/0145769 A1* | 6/2007 | Nakashita | .......... | B29C 44/0415 296/146.5 |
| 2007/0220811 A1* | 9/2007 | Flendrig | ............. | B60J 5/0416 49/352 |
| 2007/0222256 A1* | 9/2007 | Valentage | ............ | B60J 5/0405 296/146.6 |
| 2007/0267889 A1* | 11/2007 | Flendrig | ............. | B60J 5/0416 296/146.6 |
| 2008/0098655 A1* | 5/2008 | Valentage | ............ | E05F 11/382 49/352 |
| 2008/0141592 A1* | 6/2008 | Nakajima | ............ | B60J 5/0416 49/502 |
| 2009/0056230 A1* | 3/2009 | Flendrig | ............. | B60J 5/0405 49/502 |
| 2011/0254311 A1* | 10/2011 | Dajek | ............... | B29C 45/1671 296/146.6 |
| 2013/0097932 A1* | 4/2013 | Kriese | ................ | E05F 11/481 49/376 |

FOREIGN PATENT DOCUMENTS

| | | |
|---|---|---|
| JP | 2006-297927 A | 2/2006 |
| WO | WO 97/45283 A1 | 12/1997 |
| WO | WO 2014/125203 A2 | 2/2014 |

* cited by examiner

DOOR MODULE FOR VEHICLE

This application claims priority of Korean Patent Application Serial No. 10-2015-0020819, filed 11 Feb. 2015, which is incorporated herein in its entirety.

BACKGROUND OF THE INVENTION

Field of the Invention

Exemplary embodiments of the present invention relate to a door module for a vehicle, and more particularly, to a door module which is capable of modularizing hardware parts related to a vehicle door by facilitating mounting of the hardware parts, while improving the stiffness.

Description of the Related Art

In general, a vehicle door includes an outer panel forming the frame of the vehicle door, an inner panel coupled to a surface of the outer panel, facing the inside of the vehicle, and a trim part mounted at the inside of the inner panel so as to finish the inside of the vehicle with a door handle and an armrest.

The outer panel and the inner panel of the conventional vehicle door are generally formed of metal, and coupled through screw coupling, bolting, or welding.

At this time, a variety of hardware parts related to the vehicle door are mounted on the outer panel and the inner panel of the vehicle door. The variety of hardware parts include a rail member for lifting and lowering a window glass of the vehicle, a window regulator for lifting and lowering a window mounted on the rail member through a winding operation of a wire, and a speaker of the vehicle.

However, since the door panel formed of metal has a very high specific weight, the entire weight of the vehicle is increased to degrade the fuel efficiency of the vehicle. In the conventional vehicle door, main parts which perform various functions related to the door of the vehicle are mounted in the outer panel and the inner panel through separate operations by a worker. Thus, since the manufacturing process is complex and the operation time is increased, the working efficiency is lowered to cause the increase of the manufacturing cost.

Thus, there is a demand for a technology capable of modularizing the parts related to the vehicle door to simplify the manufacturing process while reducing the weight of the vehicle door.

SUMMARY OF THE INVENTION

The present invention has been made in view of the above problems, and it is an object of the present invention to provide a door module which is capable of facilitating mounting of main operation units related to a vehicle door and modularizing the main operation units.

It is another object of the present invention to provide a door module which is formed of a material for reducing the weight of a vehicle door, thereby improving the fuel efficiency of a vehicle.

It is another object of the present invention to provide a door module capable of improving stiffness when main operation units related to a vehicle door are mounted.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a door module for a vehicle, which is mounted in a door panel of a vehicle door. The door module may include: a stiffened plate including base plates formed at positions where one or more hardware parts related to the vehicle door are mounted and a connection plate for connecting the base plates, wherein the base plates and the connection plate are integrally formed; and a resin panel covering an opening of the door panel, and formed by over-molding resin onto the stiffened plate, wherein the stiffened plate is formed of a material having higher stiffness than the resin.

The stiffened plate may be formed of a metallic material.

A sealing member for waterproof may be mounted at the circumference of the resin panel.

The hardware parts may include a pair of window lift rails for guiding a lifting and lowering operation for a window of the vehicle, and the stiffened plate may include a pair of first base plates on which the respective window lift rails are mounted and a first connection plate connecting the pair of first base plates, wherein the pair of first base plates and the first connection plate are integrally formed.

The stiffened plate may be formed in an H-shape.

Resin may be over-molded onto the stiffened plate in a state where the window lift rails are coupled to the stiffened plate in advance.

Nuts or through-holes for coupling the window lift rails are formed, and resin may be over-molded onto the stiffened plate with the nuts or through-holes.

The hardware parts may further include one or more of a speaker, a window regulator motor, and a door latch, the stiffened plate may further include a second base plate for mounting one or more of the speaker, the window regulator motor, and the door latch and a second plate for connecting the first base plate and the second base plate, and the first base plate, the second base plate, the first connection plate, and the second connection plate may be integrally formed.

The stiffened plate may have a nut or through-hole for coupling one of the speaker, the window regulator motor, and the door latch, and resin may be over-molded onto the stiffened plate with the nut or the through-hole.

The door module may include a door trim which covers the opening of the door panel.

The stiffened plate may serve as a side impact beam for absorbing an impact applied to a side of the vehicle.

The door module may further include a frame installed at the peripheral edge of the resin panel and formed of the same material as the stiffened plate, the frame may be connected and integrated with the stiffened plate, and resin may be over-molded onto the frame.

The frame may have a nut or through-hole formed therein, and resin may be over-molded in the nut or through-hole.

In accordance with another aspect of the present invention, there is provided a door module for a vehicle, which is mounted on a door panel of a vehicle door. The door module may include: a stiffened plate including base plates formed at positions where one or more hardware parts related to the vehicle door are mounted and a connection plate for connecting the base plates, wherein the base plates and the connection plate are integrally formed; and a resin panel having the shape of covering an opening of the door panel, and formed by over-molding resin onto the stiffened plate, wherein the material of the stiffened plate has higher stiffness than the resin, and a door trim is mounted at a surface of the door module, facing the inside of the vehicle.

The stiffened plate may be formed of a metallic material.

The hardware parts may include a pair of window lift rails for guiding a lifting and lowering operation for a window of the vehicle, and the stiffened plate may include a pair of first base plates on which the respective window lift rails are mounted and a first connection plate for connecting the pair of first base plates.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
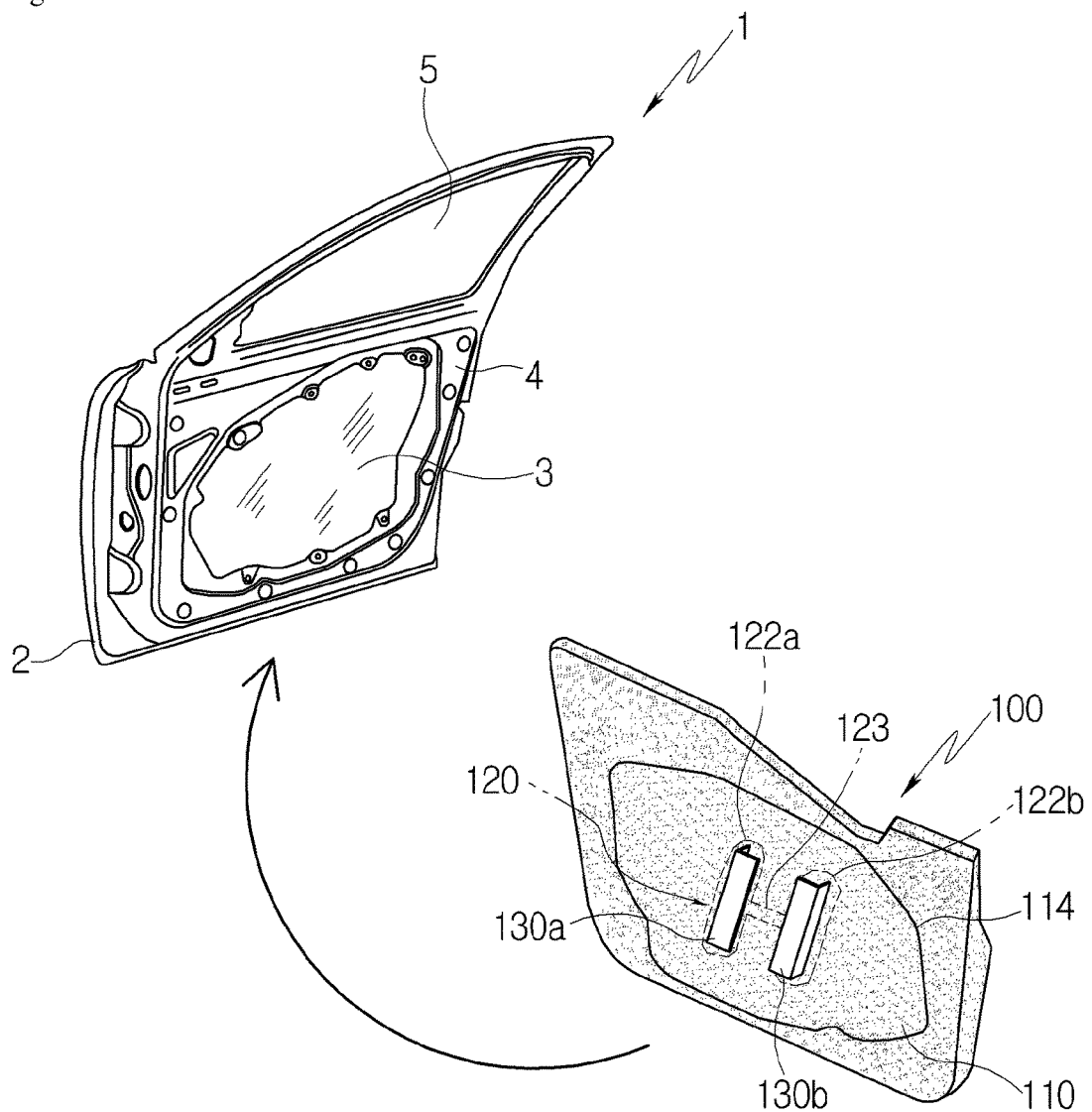
FIG. 1 is a perspective view of a door module for a vehicle according to an embodiment of the present invention.

Hereafter, embodiments of the present invention will be described with reference to the accompanying drawings such that the embodiments can be made by those skilled in the art to which the present invention pertains. The embodiments of the present invention are only examples of components described in claims, and do not limit the scope of the present invention. In order to clearly describe the present invention, portions that have nothing to do with the descriptions are omitted from the drawings.

The terms used in this specification are used only to describe specific embodiments, and not intended to limit the present invention. The terms of a singular form may include plural forms unless referred to the contrary.

In this specification, the term such as "include" or "have" specifies a property, a number, a step, an operation, a component, a part, or a combination thereof which is described in the specification, but does not exclude one or more other properties, numbers, steps, operations, components, parts or combinations thereof.

The terms including technical or scientific terms have the same meanings as the terms which are generally understood by those skilled in the art to which the present invention pertains, as long as they are differently defined. The terms defined in a generally used dictionary may be analyzed to have meanings which coincide with contextual meanings in the related art. As long as the terms are not clearly defined in this application, the terms may not be analyzed as ideal or excessively formal meanings.

Furthermore, the following embodiments are provided to more clearly describe the present invention for those skilled in the art, and the shapes and sizes of elements in the drawings are exaggerated for clarity of description.

Hereafter, the embodiments of the present invention will be described with reference to the accompanying drawings.

Figure 2:
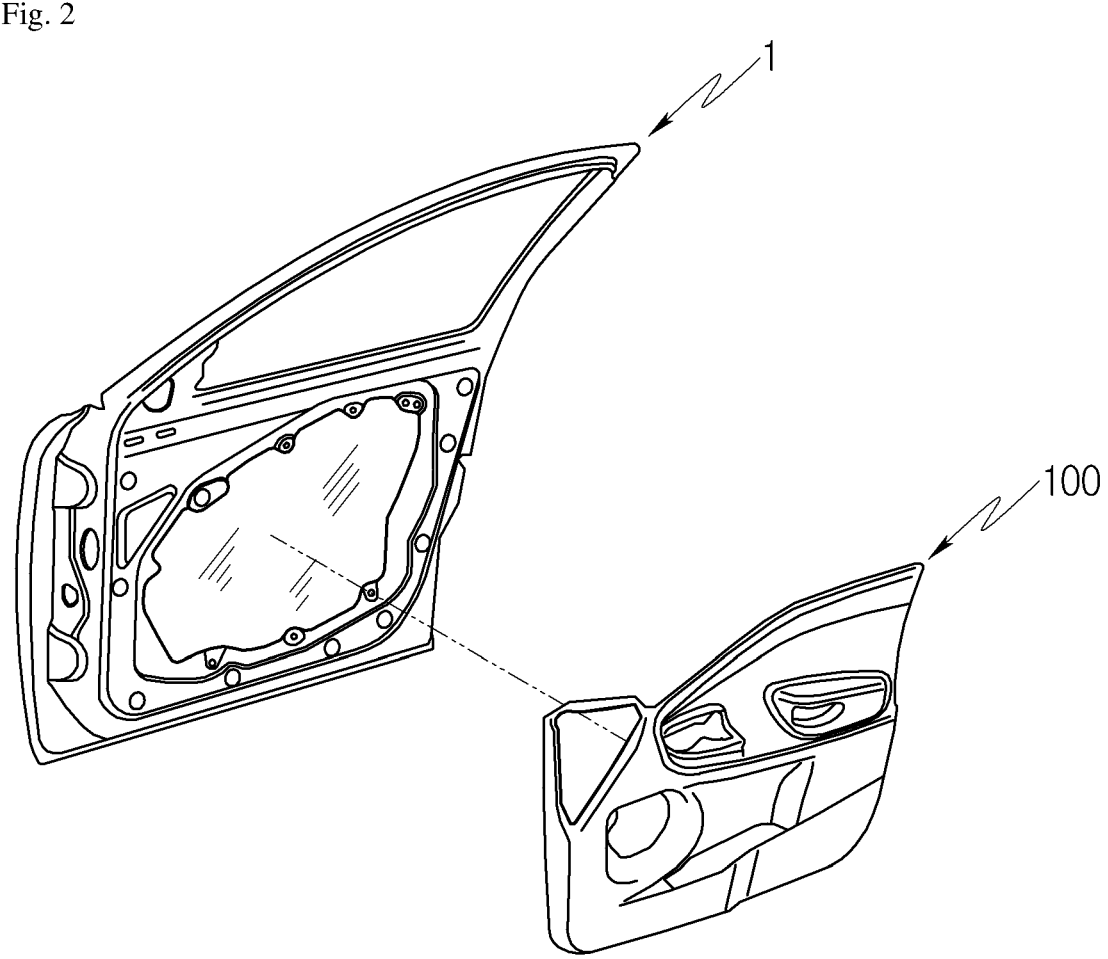
FIG. 2 is a diagram illustrating a mounting process of the door module illustrated in FIG. 1.
Figure 3:
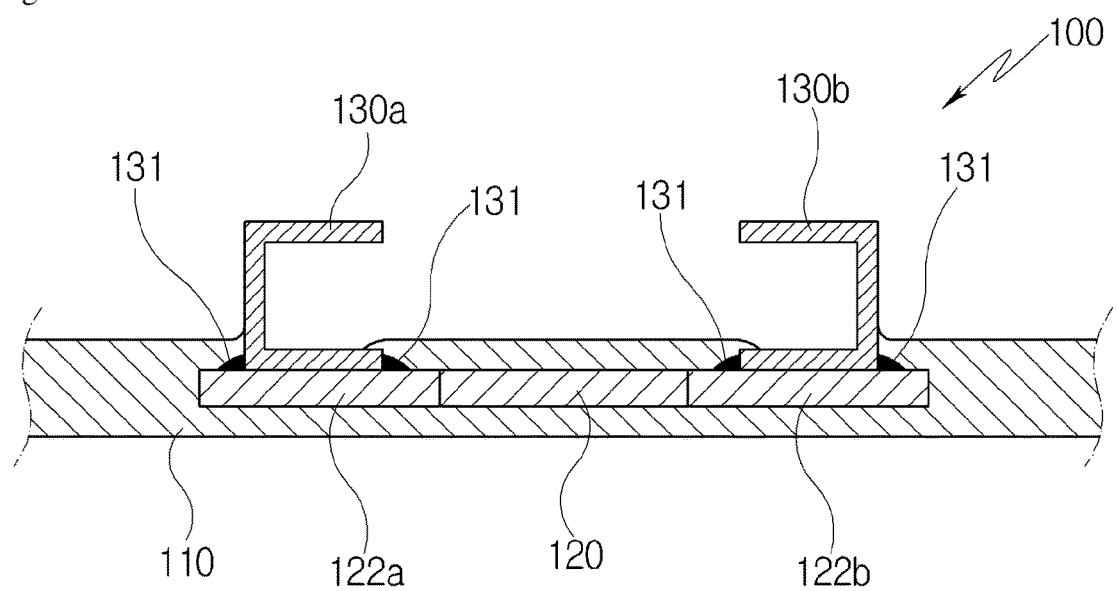
FIG. 3 is a cross-sectional view of the door module illustrated in FIG. 1.

FIG. 1 is a perspective view of a door module for a vehicle according to an embodiment of the present invention. FIG. 2 is a diagram illustrating a mounting process of the door module illustrated in FIG. 1. FIG. 3 is a cross-sectional view of the door module illustrated in FIG. 1.

Referring to FIGS. 1 and 3, the door module 100 for a vehicle according to the embodiment of the present invention is mounted and coupled to door panels 2 and 4 of a vehicle door 1. The vehicle door 1 includes an inner door panel 4 having a large opening 3 formed at a surface facing the inside of the vehicle, and an outer door panel 2 coupled to the inner door panel 4 so as to form the exterior of the vehicle door 1. The outer door panel 2 has a window frame installed at the upper part thereof so as to guide a window 5 of the vehicle.

In the present embodiment, the door module 100 for a vehicle is mounted on the inner door panel 4, and covers the opening 3 of the inner door panel 4. As illustrated in FIG. 2, a trim such as a door handle or armrest is formed on one surface of the door module 100, facing the inside of the vehicle. That is, the door module 100 may be integrally formed with the door trim.

The door module 100 for a vehicle includes a stiffened plate 120 and a resin panel 110.

The stiffened plate 120 improves the stiffness of the door module 100 on which various hardware parts related to the vehicle door 1 are mounted, and prevents the deformation and damage of the door module 100, which may be caused by the lack of stiffness, when the door module 100 is manufactured and installed and while the vehicle is operated. The stiffened plate 120 includes base plates 122a and 122b formed at positions where one or more hardware parts related to the vehicle door 1 are mounted, and a connection plate 123 for connecting the base plates 122a and 122b.

In the present embodiment, a pair of window lift rails 130a and 130b for guiding a lifting and lowering operation for the window 5 of the vehicle will be taken as an example of a hardware part, for convenience of description. As illustrated in FIGS. 1 and 2, the pair of window lift rails 130a and 130b are formed in an elongated shape having a bent cross-section. The pair of window lift rails 130a and 130b are separated in parallel and installed on the door module 100. Specifically, the pair of window lift rails 130a and 130b are installed in parallel to each other on the stiffened plate 120. In the present embodiment, the pair of window lift rails 130a and 130b may have a U-shaped cross-section, for example. However, the present invention is not limited thereto, but the cross-sectional shape of the window lift rails 130a and 130b may be changed according to the shape of a window carrier (not illustrated) which is mounted on the window lift rails 130a and 130b so as to support the window 5. The window lift rails 130a and 130b may be formed of a metallic material having higher stiffness than resin.

The pair of base plates 122a and 122b of the stiffened plate 120 are formed in parallel to each other at positions where the pair of window lift rails 130a and 130b are mounted, and the connection plate 123 of the stiffened plate 120 connects the middle portions of the respective base plates 122a and 122b. Thus, the stiffened plate 120 has an H-shape as a whole. Due to the H-shape formed through the connection plate 123, the stiffened plate 120 can increase the stiffness of the door module 100, and prevent the deformation and damage of the door module 100, compared to when only the pair of base plates 122a and 122b are used. The base plates 122a and 122b and the connection plate 123 may be integrally formed through press processing or casting. Alternatively, the base plates 122a and 122b and the connection plate 123 may be manufactured as separate members, and coupled through bolting or welding.

The resin panel 110 has the shape of covering the opening 3 of the inner door panel 4, and is formed by over-molding resin onto the stiffened plate 120. The resin panel 110 has the shape corresponding to the opening 3 as a whole, in order to block the opening 3 of the inner door panel 4, and a sealing member 144 formed of rubber is mounted on the circumference of the resin panel 110, in order to seal the resin panel 110.

Referring to FIG. 3, a process of manufacturing the door module 100 according to the embodiment of the present invention will be described in detail. The pair of window lift rails 130a and 130b are installed on the stiffened plate 120 at positions separated in parallel. In the present embodiment, the window lift rails 130a and 130b are coupled and fixed to the stiffened plate 120 through welding 131. Then, as resin is over-molded onto both surfaces of the stiffened plate 120 and the welded parts 131, the resin panel 110 is formed. The resin panel 110 may be manufactured through a conventional method such as plastic injection molding.

When steel-made hardware parts such as the window lift rails 130a and 130b are directly mounted on the resin panel 110, the resin panel 110 may be damaged during an assembly process, due to the lack in stiffness of the resin panel 110. While the vehicle door 1 is used after the hardware parts are mounted, the resin panel 110 is highly likely to be damaged. In the present embodiment, the hardware parts such as the window lift rails 130a and 130b are not directly mounted on the resin panel 110, but resin is over-molded onto the stiffened plate 120 so as to form the resin panel 110 after the hardware parts are installed on the stiffened plate 120. Thus, the stiffness of the door module 100 is improved, and the resin panel 110 is not likely to be damaged when the door module 100 is manufactured. Furthermore, even while the vehicle door 1 is used, the resin panel 110 is not likely to be damaged.

In the door module 100 for a vehicle according to the embodiment of the present invention, main hardware parts related to the vehicle door, such as the window lift rails 130a and 130b, are coupled and modularized in advance to simplify the assembly process of the vehicle door. Thus, the manufacturing process for the vehicle door is simplified, and the time required for the manufacturing process is shortened, which makes it possible to reduce the manufacturing cost. Furthermore, as the stiffness of the door module 100 is increased through the stiffened plate 120, the damage of the door module 100 can be prevented when the door module 100 is assembled and while the door module 100 is used.

In the door module 100 for a vehicle according to the embodiment of the present invention, the stiffened plate 120 for improving stiffness is installed only at portions where main operation units related to the vehicle door, such as the window lift rails 130a and 130b, are mounted, and the resin panel 110 formed of a resin material is installed at the other portions. Thus, the use of a metallic material for improving the stiffness can be minimized to reduce the entire weight of the door module 100. Therefore, the weight of the vehicle door 1 can be reduced to improve the fuel efficiency of the vehicle.

The stiffened plate 120 may serve as a side impact beam of the vehicle, and protect passengers in the vehicle from an external impact through the vehicle door 1.

Hereafter, a door module for a vehicle according to another embodiment of the present invention will be described.

Figure 4:
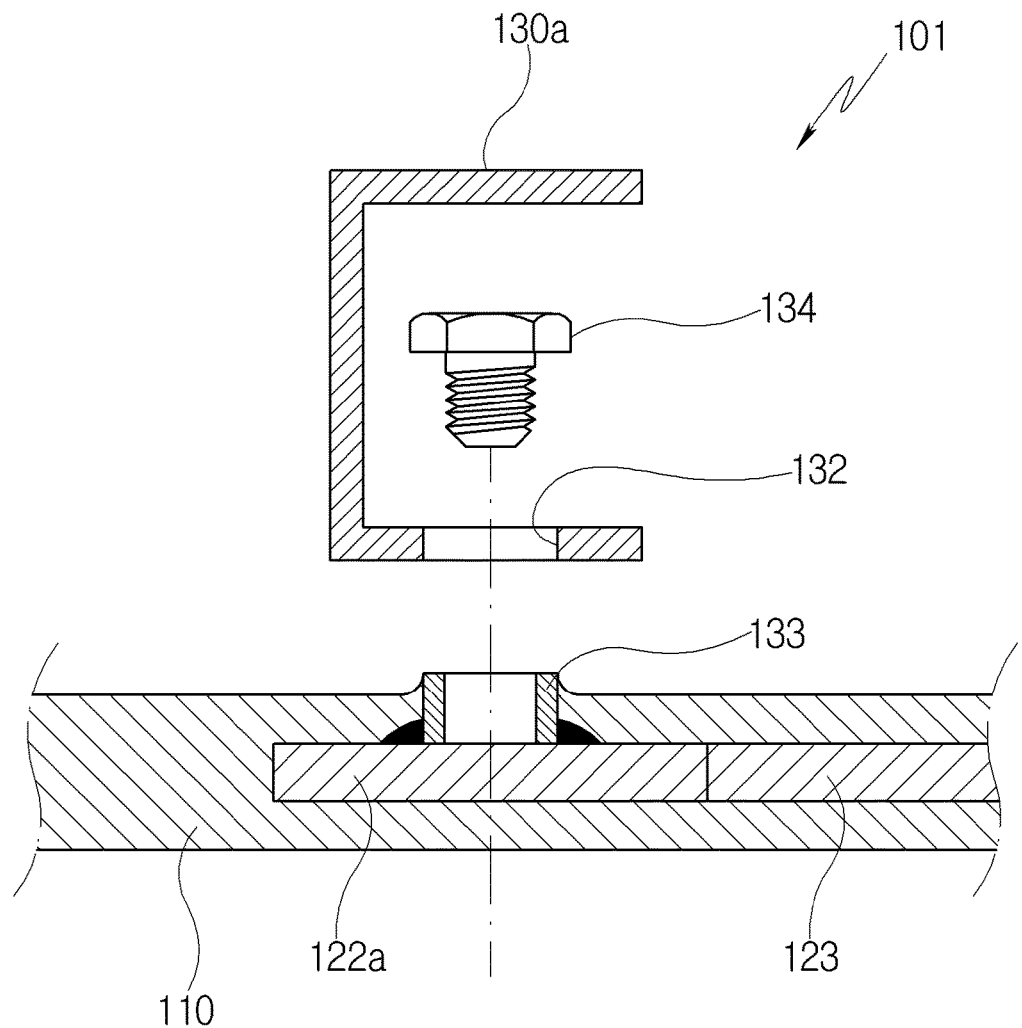
FIG. 4 is a cross-sectional view of a door module for a vehicle according to another embodiment of the present invention.

FIG. 4 is a cross-sectional view of a door module for a vehicle according to another embodiment of the present invention.

Referring to FIG. 4, the door module 101 for a vehicle according to the present embodiment has almost the same structure as the door module 100 for a vehicle according to the above-described embodiment, except for some components. The detailed descriptions of the same components as those of the above-described embodiment are omitted, and the following descriptions will be focused on the different components.

In the door module 101 illustrated in FIG. 4, the pair of window lift rails 130a and 130b are not coupled to the stiffened plate 120 through welding in advance, unlike the vehicle door module 100 according to the above-described embodiment. Instead, a nut 133 is welded to the stiffened plate 120 in advance. Furthermore, a through-hole 132 for bolting is formed at one surface of the window lift rail 130a or 130b.

The door module 101 for a vehicle according to the present invention does not correspond to the structure that the window lift rails 130a and 130b are welded to the stiffened plate 120 in advance and resin is over-molded. Instead, the nut 133 for mounting the window lift rail 130a or 130b is welded to the stiffened plate 120 in advance, and resin is over-molded onto the stiffened plate 120 with the nut 133 and forms the resin panel 110. Then, as the window lift rail 130a or 130b is fixed to the nut 133 through a bolt 134, the window lift rail 130a or 130b is fixed to the stiffened plate 120. Furthermore, a through-hole (not illustrated) may be formed in place of the nut 133 such that the window lift rail 130a or 130b is coupled to the stiffened plate 120 through a rivet.

The door module 101 according to the present embodiment can also obtain the same effect as the door module 100 according to the above-described embodiment.

Hereafter, a door module for a vehicle according to another embodiment of the present invention will be described with reference to FIG. 5.

Figure 5:
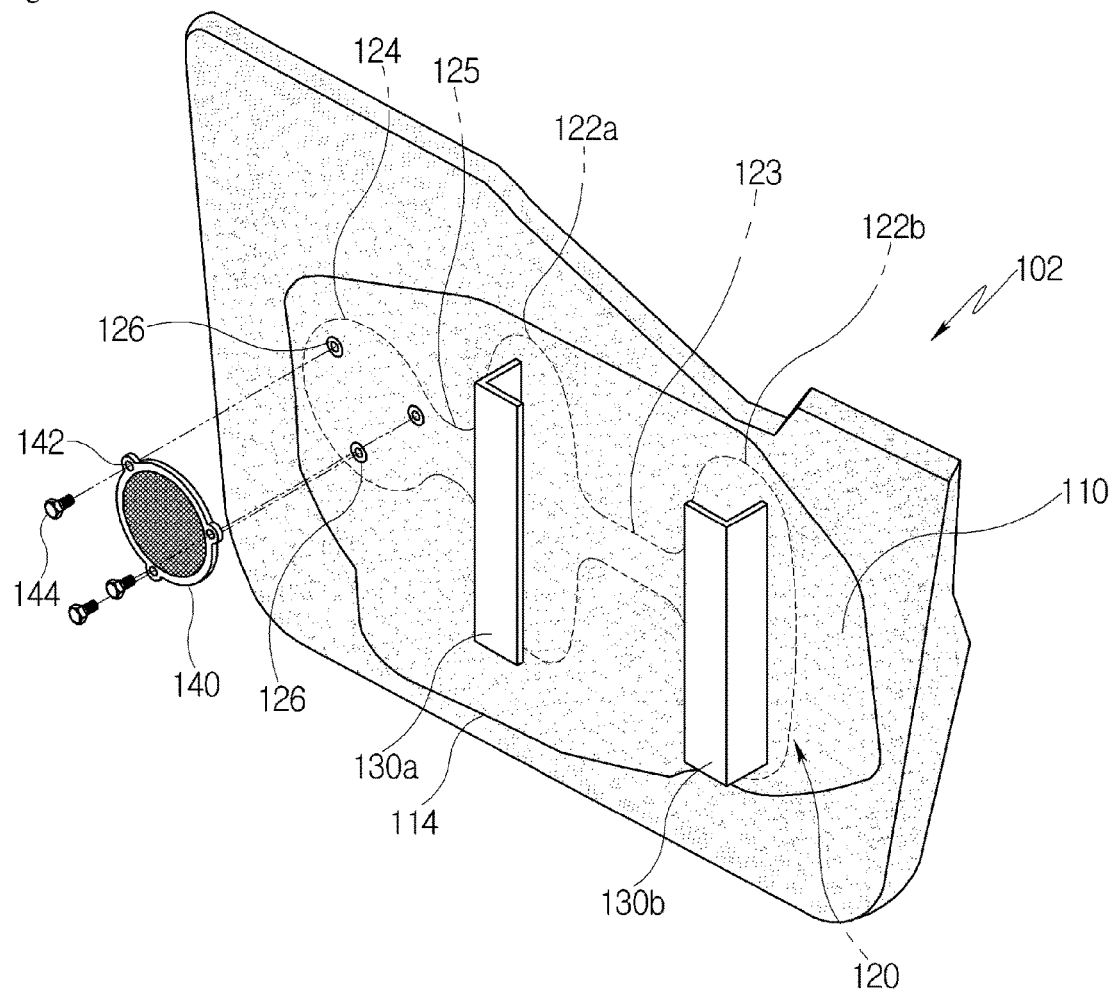
FIG. 5 is a perspective view of a door module for a vehicle according to another embodiment of the present invention.

FIG. 5 is a perspective view of a door module for a vehicle according to another embodiment of the present invention.

Referring to FIG. 5, the door module 102 for a vehicle according to the present embodiment has almost the same structure as the door module 100 for a vehicle according to the above-described embodiment, except for some components. The detailed descriptions of the same components as those of the above-described embodiment are omitted, and the following descriptions will be focused on the different components.

The door module 102 illustrated in FIG. 5 further includes a second base plate 124 and a second connection plate 125, which are placed at positions where the speaker 140 is mounted, in addition to the components of the door module 100 illustrated in FIG. 1. Specifically, the door module 102 for a vehicle according to the embodiment of the present invention further includes the second base plate 124 for mounting the speaker 140 and the second connection plate 125 for connecting the second base plate 124 and the base plate 122a, in addition to the connection plate 123 and the pair of base plates 122a and 122b for mounting the pair of window lift rails 130a and 130b.

In the present embodiment, the speaker 140 has a circular shape, and the second connection plate 125 also has a circular shape corresponding to the speaker 140. However, the shape of the second connection plate 125 is not limited to the circular shape, and may be changed according to the shape of the speaker 140 and the installation position of the second connection plate 125. The base plates 122a and 122b, the connection plate 123, the second base plate 124, and the second connection plate 125 are integrally formed through press processing or casting, and include a metallic material. Alternatively, the base plates 122a and 122b, the connection plate 123, the second base plate 124, and the second connection plate 125 are manufactured as separate members, and coupled through bolting or welding.

As the second connection plate 125 has a much smaller width than the diameter of the second base plate 124, the amount of metal used in the stiffened plate 120 can be reduced, and the weight of the stiffened plate 120 is not increased more than necessary. Furthermore, since the stiffened plate 120 is integrally formed, the number of manufacturing processes can be reduced, compared to when the second base plate 124 is separately formed. Thus, the time required for the manufacturing process can be reduced.

In the present embodiment, a plurality of fastening parts for bolting are formed at even intervals on the outer peripheral edge of the speaker 140 along the circumferential direction. Furthermore, nuts 126 for mounting the speaker 140 are previously welded to the base plate 124 at positions corresponding to the fastening parts 142, and resin is over-molded onto the second base plate 124 with the nut 126 and forms the resin panel 110. Then, as the speaker 140 is fixed to the nuts 126 through bolts 144, the speaker 140 is fixed to the second base plate 124. Furthermore, through-holes (not illustrated) may be formed in place of the nuts 126 such that the speaker 140 is coupled to the second base plate 124 through rivets.

The door module 102 according to the present embodiment can obtain the same effect as the door module 100 according to the above-described embodiment. Furthermore, in the present embodiment, the speaker 140 is not directly mounted on the resin panel 110, but installed on the stiffened plate 120. When the speaker 140 is directly mounted on the resin panel 110, the resin panel 110 may be vibrated by sound pressure of the speaker 140 in operation. In the door module 102 for a vehicle according to the present embodiment, the speaker 140 is mounted on the resin panel 110, but mounted on the stiffened plate 120, which makes it possible to prevent vibration caused by sound pressure which may be generated during operation of the speaker 140.

Hereafter, a door module for a vehicle according to another embodiment of the present invention will be described.

Figure 6:
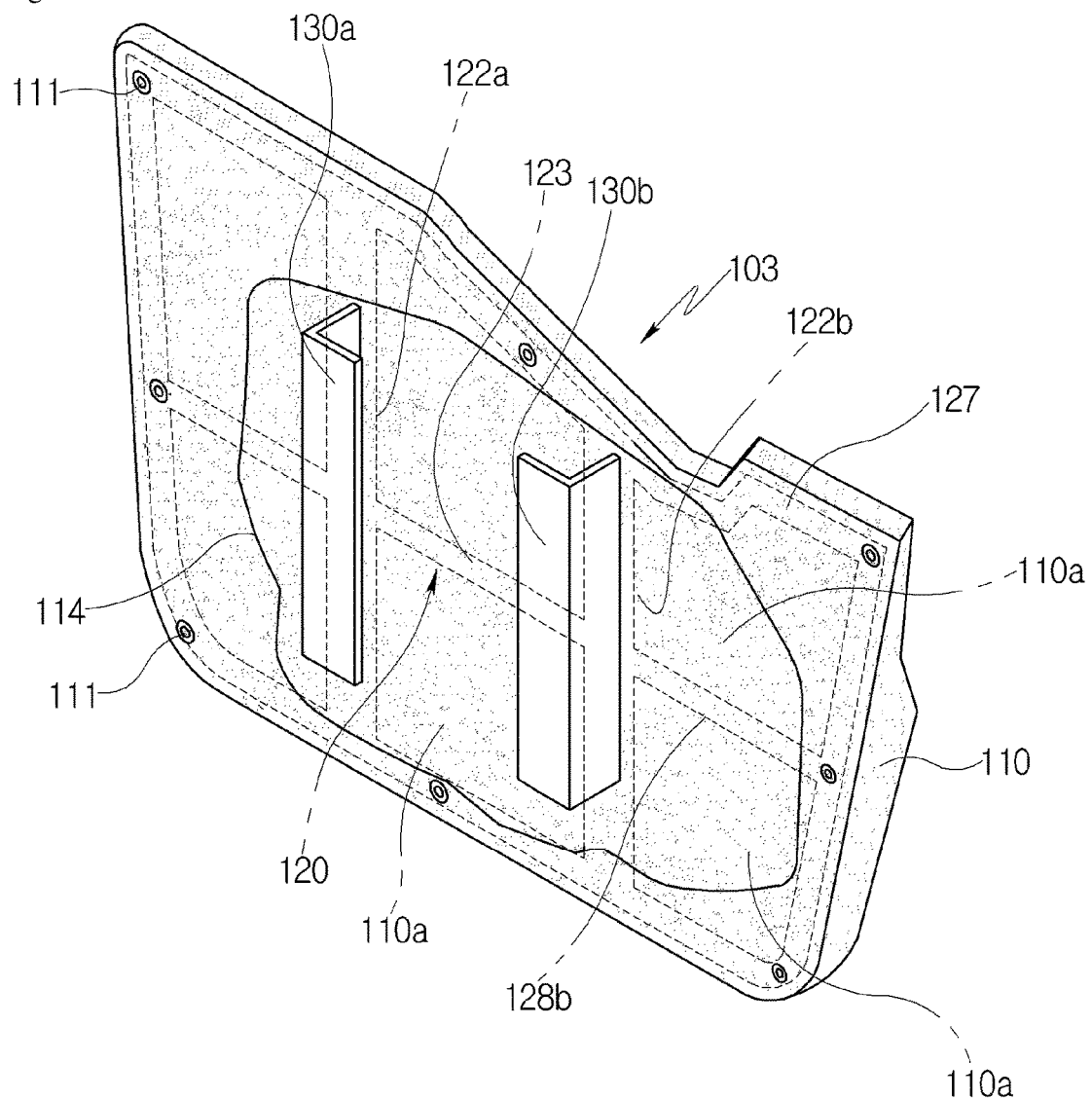
FIG. 6 is a perspective view of a door module for a vehicle according to another embodiment of the present invention.

FIG. 6 is a perspective view of a door module for a vehicle according to another embodiment of the present invention.

Referring to FIG. 6, the door module 103 for a vehicle according to the embodiment of the present invention has almost the same structure as the door module 100 for a vehicle according to the above-described embodiment, except for some components. The detailed descriptions of the same components as those of the above-described embodiment are omitted, and the following descriptions will be focused on the different components.

The door module 103 illustrated in FIG. 6 further includes a frame 127 which is installed at the edge of the resin panel 110 and formed of the same material as the stiffened plate 120, in addition to the components of the door module 100 for a vehicle according to the above-described embodiment.

The frame 127 has a shape corresponding to the outer peripheral shape of the resin panel 110 and having a predetermined width. The upper and lower pars of the frame 127, based on FIG. 6, are directly connected to the pair of base plates 122a and 122b, the left-side part of the frame 127 is connected to the base plate 122a through a third connection plate 128a, and the right-side part of the frame 127 is connected to the base plate 122b through a fourth connection plate 128b. The frame 127 is integrally formed with the stiffened plate 120 through press processing or casting. More specifically, the frame 127, the third connection plate 128a, and the fourth connection plate 128b are integrally formed through press processing or casting, and include the same material as the connection plate 123 and the pair of base plates 122a and 122b for mounting the pair of window lift rails 130a and 130b. Alternatively, the frame 127, the third connection plate 128a, and the fourth connection plate 128b may be manufactured as separate members, and coupled to the connection plate 123 and the pair of base plates 122a and 122b for mounting the pair of window lift rails 130a and 130b through bolting or welding.

Furthermore, a plurality of nuts 111 for mounting the door module 130 are coupled to the frame 127 through welding or the like, and resin is over-molded onto the frame 127 with the nuts 11 and forms the resin panel 110. As the frame 127 and the stiffened plate 120 are integrally formed, a plurality of openings 110a are formed. The openings 110a are not reinforced by a metallic material, but filled with only resin. The openings 110a can reduce the entire weight of the vehicle door 1 while increasing the stiffness of the door module 103, thereby contributing to the improvement in fuel efficiency of the vehicle.

The frame 127 may further increase the entire stiffness of the door module 103 with the stiffened plate 120, the third connection plate 128a, and the fourth connection plate 128b, and prevent the damage of the door module 103 when the door module 103 is mounted on the inner door panel 4 (refer to FIG. 1) and the vehicle door 1 is used. When the door module 103 is mounted on the inner door panel 4 through bolts in a state where the edge part of the door module 103 is formed of only resin, the door module 130 is likely to be damaged due to the lack in stiffness of the door module 103, when the door module 103 is mounted and while the vehicle door 1 is used. In the present embodiment, as the frame 127 formed of a metallic material is installed and resin is over-mold onto the frame 127 so as to manufacture the door module 130, the stiffness of the door module 103 may be further increased, and the door module 103 may be mounted on the inner door panel 4 through the nuts 111 coupled to the frame 127, which makes it possible to prevent the damage of the door module 103.

In place of the nuts 111 formed in the frame 127, through-holes (not illustrated) may be formed to couple the door module 130 to the inner door panel 4 through rivets.

The door module 101 according to the embodiment of the present invention can also obtain the same effect as the door module 100 according to the above-described embodiment.

Figure 7:
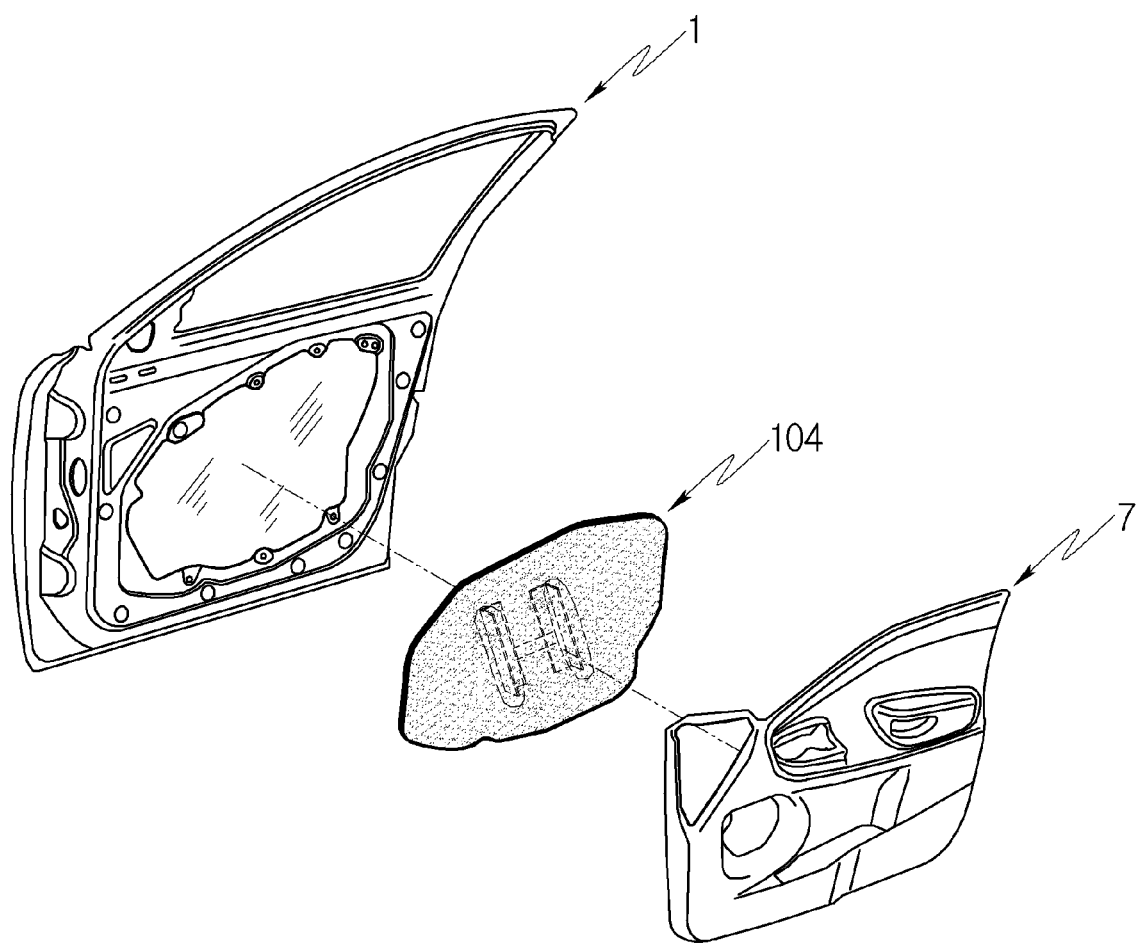
FIG. 7 is a diagram for describing a mounting process of a door module for a vehicle according to another embodiment of the present invention.

FIG. 7 is a diagram for describing a mounting process of a door module for a vehicle according to another embodiment of the present invention.

Referring to FIG. 7, the door module 104 for a vehicle according to the embodiment of the present invention is not manufactured as a door trim, unlike the door module 100 for a vehicle according to the above-described embodiment. The door module 104 according to the embodiment of the present invention is manufactured in the form of a separate carrier, and mounted on the inner door panel 4 so as to cover the opening 3 of the inner door panel 4. After the door module 104 is mounted, a separate door trim 7 is mounted on one surface of the door module 104, facing the inside of the vehicle.

The door module 104 according to the embodiment of the present invention can also obtain the same effect as the door module 100 according to the above-described embodiment.

In the above-described embodiments, the window lift rails 130a and 130b and the speaker 140 have been taken as examples of the hardware parts related to the vehicle door. However, the present invention is not limited thereto, but other hardware parts such as a latch (not illustrated) of the vehicle door and a window regulator motor (not illustrated) for lifting or lowering a vehicle window may be mounted on the door module.

Furthermore, the stiffened plate formed of a metallic material has been taken as an example for description. In addition to metal, however, a material having higher stiffness than the resin material of the resin panel 110 may be used. For example, FRP (Fiber Reinforced Plastic) with glass fiber or carbon fiber may be used in place of the metallic material.

According to the embodiments of the present invention, the door module for a vehicle can facilitate mounting of the main operation units related to the vehicle door, and modularize the main operation units, thereby simplifying the assembly process for the vehicle door.

Thus, the manufacturing process for the vehicle door can be simplified, and the time required for the manufacturing process can be shorted, which makes it possible to reduce the manufacturing cost.

Furthermore, the door module for a vehicle can reduce the weight of the vehicle, thereby improving the fuel efficiency of the vehicle.

Furthermore, the door module for a vehicle can improve the stiffness of the main operation units related to the vehicle door, when the main operation units are mounted, thereby preventing the damage of the main operation units when the main operation units are assembled and used.

Furthermore, the door module for a vehicle can serve as a side impact beam to improve the stiffness of the entire door.

While the present invention has been described with respect to the specific embodiments, it will be apparent to those skilled in the art that various changes and modifications may be made without departing from the spirit and scope of the invention as defined in the following claims.

What is claimed is:

1. A door module for a vehicle, which is mounted in a door panel of a vehicle door, comprising:
    a stiffened plate comprising base plates provided at positions where one or more hardware parts for the vehicle door are mounted and a connection plate for connecting the base plates, wherein the base plates and the connection plate are integrally formed; and
    a resin panel covering an opening of the door panel, and formed by over-molding resin onto the stiffened plate,
    wherein the stiffened plate is formed of a material having higher stiffness than the resin, and
    wherein the hardware parts comprise a pair of window lift rails for guiding a lifting and lowering operation for a window of the vehicle, and the base plates comprise a pair of first base plates on which the respective window lift rails are mounted, and the connection plate comprises a first connection plate connecting the pair of first base plates, wherein the pair of first base plates and the first connection plate are integrally formed, and wherein the stiffened plate is formed in an H-shape.

2. The door module according to claim 1, wherein the stiffened plate is formed of a metallic material.

3. The door module according to claim 1, wherein a sealing member for waterproofing is mounted at a peripheral edge of the resin panel.

4. The door module according to claim 1, wherein resin is over-molded onto the stiffened plate in a state where the window lift rails are coupled to the stiffened plate.

5. The door module according to claim 1, wherein nuts or through-holes for coupling the window lift rails are provided, and resin is over-molded onto the stiffened plate with the nuts or through-holes.

6. The door module according to claim 1, wherein the hardware parts further comprise one or more of a speaker, a window regulator motor, and a door latch,
    the base plates further comprise a second base plate for mounting one or more of the speaker, the window regulator motor and the door latch, and the connection plate further comprises a second connection plate for connecting one of the first base plates and the second base plate, and
    the first base plates, the second base plate, the first connection plate, and the second connection plate are integrally formed.

7. The door module according to claim 6, wherein the stiffened plate has a nut or through-hole for coupling one of the speaker, the window regulator motor, and the door latch, and resin is over-molded onto the stiffened plate with the nut or the through-hole.

8. The door module according to claim 1, wherein the door module comprises a door trim which covers the opening of the door panel.

9. The door module according to claim 1, wherein the stiffened plate serves as a side impact beam for absorbing an impact applied to a side of the vehicle.

10. The door module according to claim 1, further comprising a frame surrounding the resin panel and formed of the same material as the stiffened plate,
    wherein the frame is connected and integrated with the stiffened plate, and resin is over-molded onto the frame.

11. The door module according to claim 10, wherein the frame has a nut or through-hole provided therein, and resin is over-molded in the nut or through-hole.

12. A door module for a vehicle, which is mounted on a door panel of a vehicle door, comprising:
    a stiffened plate comprising base plates provided at positions where one or more hardware parts for the vehicle door are mounted and a connection plate for connecting the base plates, wherein the base plates and the connection plate are integrally formed; and
    a resin panel covering an opening of the door panel, and formed by over-molding resin onto the stiffened plate,
    wherein the material of the stiffened plate has higher stiffness than the resin, and a door trim is mounted at a surface of the door module, facing the inside of the vehicle, and
    wherein the door module further comprises a frame surrounding the resin panel and formed of the same material as the stiffened plate, and
    wherein the frame is connected and integrated with the stiffened plate, and resin is over-molded onto the frame.

13. The door module according to claim 12, wherein the stiffened plate is formed of a metallic material.

14. The door module according to claim 12, wherein the hardware parts comprise a pair of window lift rails for guiding a lifting and lowering operation for a window of the vehicle, and the base plates comprise a pair of first base plates on which the respective window lift rails are mounted, and the connection plate comprises a first connection plate for connecting the pair of first base plates.

* * * * *